March 9, 1948. J. K. WOOD 2,437,631
SUPPORT
Filed April 20, 1945 4 Sheets-Sheet 1
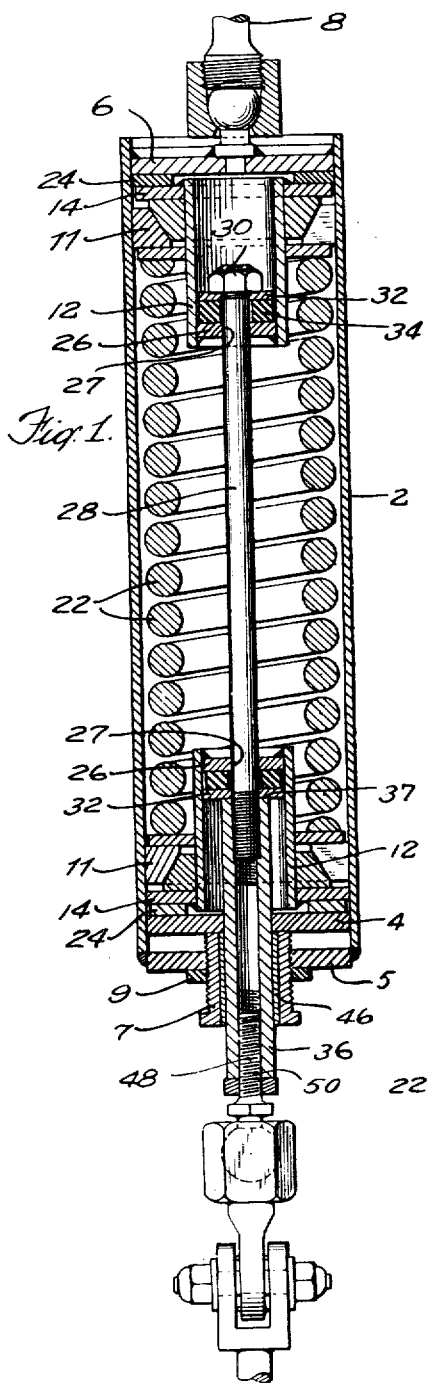
Fig. 1.
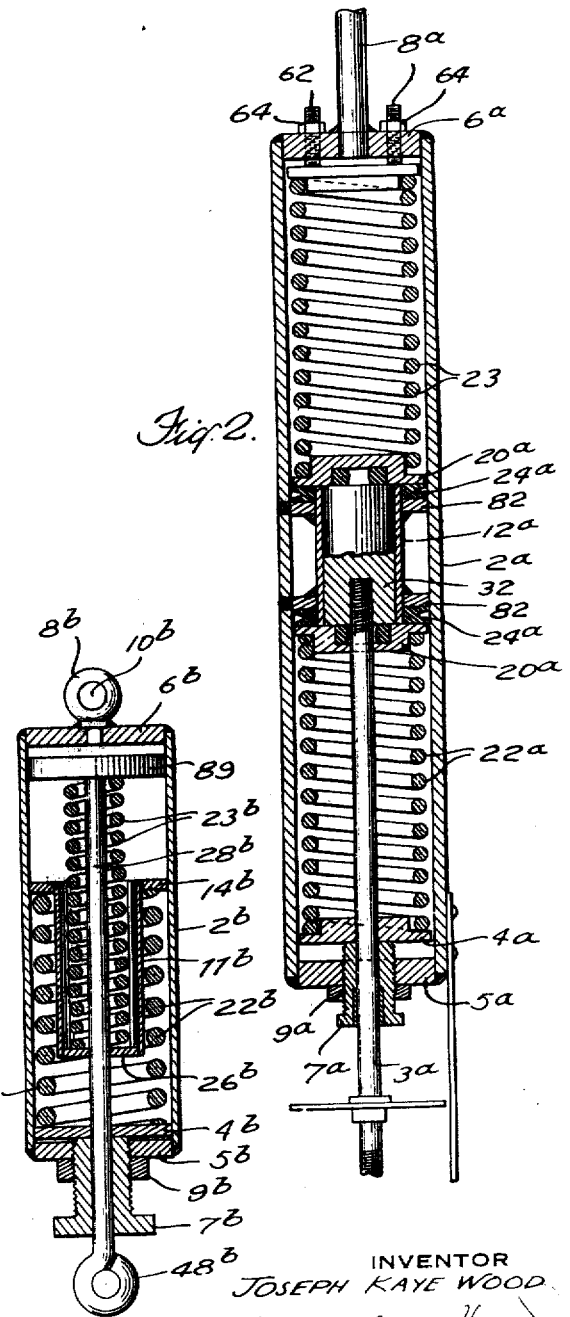
Fig. 2.
Fig. 3.
INVENTOR
JOSEPH KAYE WOOD
BY
Blair, Curtis & Hayward
ATTORNEYS

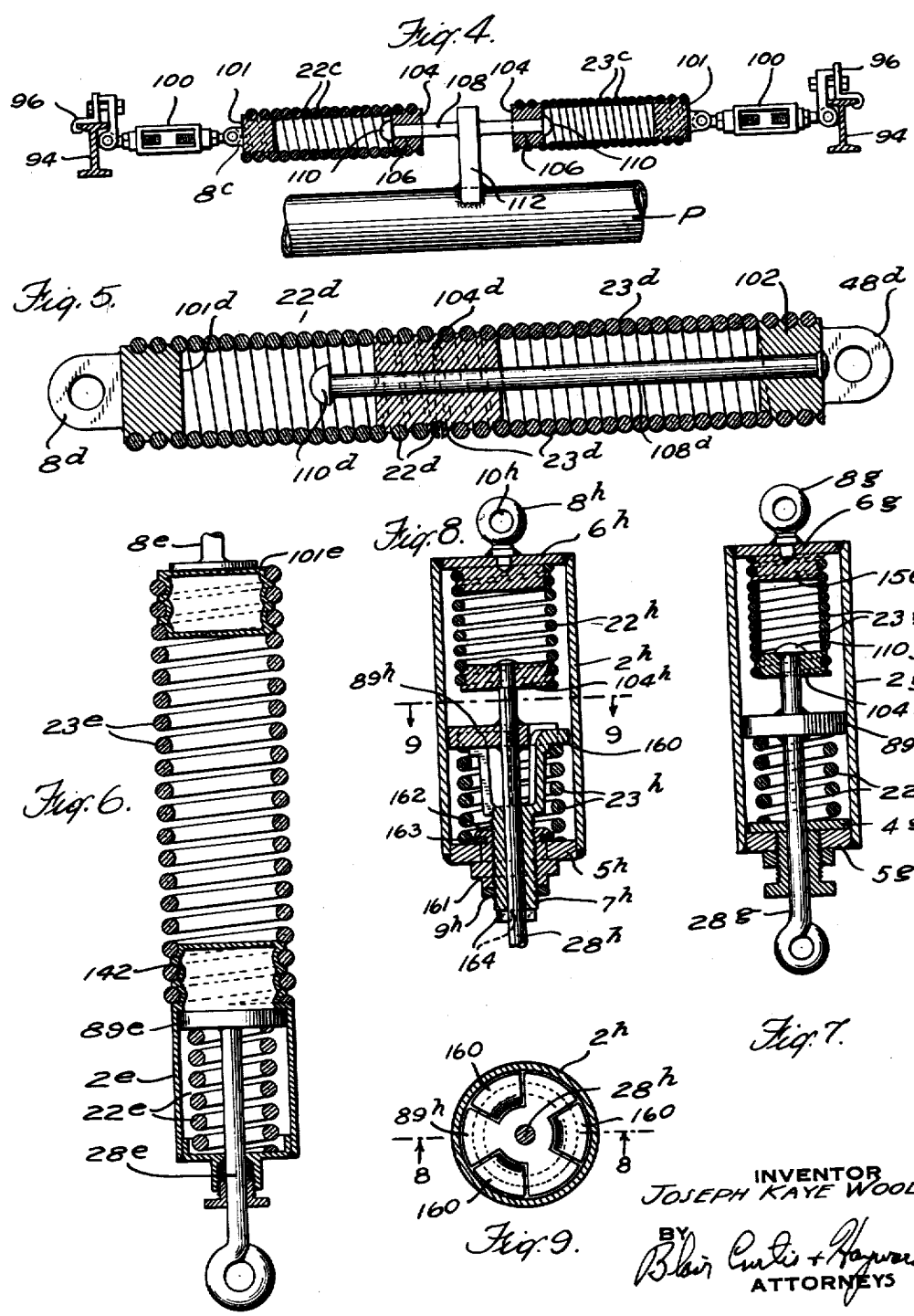

March 9, 1948.  J. K. WOOD  2,437,631
SUPPORT
Filed April 20, 1945   4 Sheets-Sheet 3

DEFLECTION

INVENTOR
JOSEPH KAYE WOOD
BY
ATTORNEYS

March 9, 1948.　　J. K. WOOD　　2,437,631
SUPPORT
Filed April 20, 1945　　4 Sheets-Sheet 4

INVENTOR
JOSEPH KAYE WOOD
BY Blair, Curtis & Howard
ATTORNEYS

Patented Mar. 9, 1948

2,437,631

UNITED STATES PATENT OFFICE 2,437,631

SUPPORT

Joseph Kaye Wood, New York, N. Y., assignor to General Spring Corporation, New York, N. Y., a corporation of New York Application April 20, 1945, Serial No. 589,373

18 Claims. (Cl. 248—54)

This invention relates to spring supports for piping, and other equipment which is subject to alternating or intermittent forces tending to produce harmonic motion, and particularly to spring hangers and sway braces for piping, and it has for its general object the provision of an improved, simple and compact non-harmonic hanger, sway brace or other spring support.

Constant support spring hangers which have a substantially horizontal line characteristic are suitable for use with non-resonant and therefore suitable for use with pipe lines where there is considerable vibration. In less expensive variable support spring hangers, however, in which the characteristic is not horizontal but has a constant slope, dependent upon the load-deflection rate of the spring, there is a definite natural period of resonant vibration. If, therefore, in a variable support hanger, the frequency of an impressed vibration be equal to or nearly equal to, or to a higher or lower harmonic of, this natural period, resonance will be established. Amplification of the amplitude of an impressed vibration will result such as to make such hangers unsuitable for use with pipe lines or other equipment subject to vibration. In pipe lines this problem is particularly acute, because the pipe itself may be an elastic vibrating member more or less analogous to a violin string or a chime bar. The hanger or sway brace, therefore, should not only be non-harmonic in itself, but capable of making the entire system non-harmonic, including piping, supports and braces, etc.

The present invention aims, therefore, to provide an improved variable support spring hanger in which the spring means is so constructed and arranged that it has a distinct break in its load-deflection characteristic so related to a predetermined mid-point in its available vibratory range that liability to the establishment of resonance from vibrations impressed thereon will be avoided.

In my prior copending application Serial No. 531,183, filed April 15, 1944, now patent No. 2,421,822, of which the present application is a continuation in part, and in Serial No. 586,093, filed April 2, 1945, now Patent No. 2,420,276, I have disclosed devices of the character described above in which springs acting alternately or alternately acting at opposite ends are positively limited at a mid-position. Although said prior applications are designed primarily for sway braces, the principle is applicable also to spring hangers which allow substantial movement (e. g. under thermal expansion or inertia or due to relative movement of parts to which the piping is attached). The present application relates particularly to such flexible supports (as distinguished from steadying or damping devices) and to the broad invention common to all of these applications.

In my prior patent No. 2,335,834 I have disclosed a spring hanger in which an auxiliary spring acting in parallel with the main supporting spring comes into action at a mid-point of normal operation. I have now found advantage in the use of multiple springs in series, one or more of which goes out of action at the mid-point with consequent changes in the load-deflection characteristic of the system and consequently of its natural frequency, so as to make the system non-harmonic.

The spring means of the present invention may comprise a single spring having the load applied thereto alternately at its opposite ends or it may comprise two springs arranged so that the load is applied alternately to each or it may comprise a series spring arrangement in which one of the springs of the series (or serially related parts of a non-uniform spring, e. g. as described and claimed in my copending application Serial No. 390,415, filed April 25, 1941), now abandoned, goes out of operation while another or others continue operative. With all of these forms spring means are combined with connections to the piping or other part to be supported or stayed and to the anchorage such that an abrupt limitation of deflection occurs at a mid-point, with a significant change in the characteristic of the spring means.

In this specification and the accompanying drawings I have shown and described a preferred embodiment of my invention and various modifications thereof; but it is to be understood that these are not intended to be exhaustive nor limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

In the drawings:

Figure 1 is a view in axial section of a sway brace for piping or the like;

Figure 2 is a similar view in axial section of another sway brace;

Figure 3 is a similar view in axial section of a pipe hanger or like support;

Figure 4 is a view partly in plan and partly in axial section of a simple tension spring sway brace;

Figure 5 is a view partly in section partly in elevation of a series tension spring hanger;

Figure 6 is a view partly in section and partly in elevation of a hanger combining tension and compression springs in series;

Figure 7 is a view in axial section of another spring hanger;

Figure 8 is a view similar to that of Figure 7 taken on line 8—8 of Figure 9, showing a modified hanger;

Figure 9 is a cross-sectional view taken on line 9—9 of Figure 8;

in Figures 2 and 4) or single spring sway braces as in Figure 1;

Figure 10:
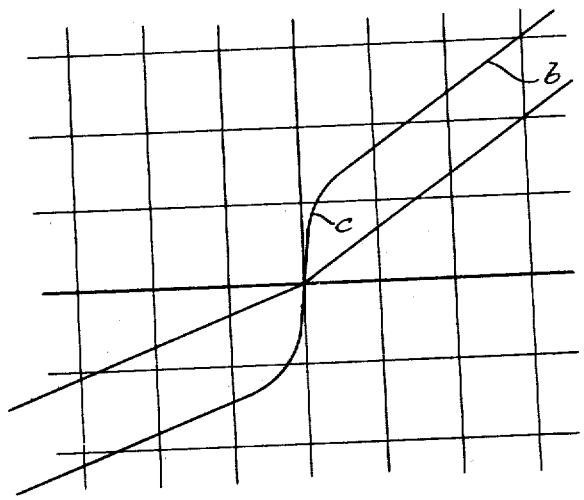
Figure 10 is a diagrammatic representation of the load-deflection characteristics of sway braces having springs of different characteristics as in Figures 2 and 4.

In the embodiment of the invention shown in Figure 1, which is one of the simplest embodiments of the invention, the non-resonant hanger or sway brace comprises a tube or cylinder 2 having end pieces 5 and 6 fitted therewithin and welded in place near the ends thereof, the upper end 6 serves as an abutment piece to limit the action of the spring and piston, but at the lower end a separate abutment plate 4 is held above the end 5 by an adjustment nut 7 having a locknut 9.

A ball and socket connection 8 for connection with any suitable support or anchorage is welded to the outer face of the end 6. Inside the cylinder are two pistons 11, of substantially identical construction, located at opposite ends thereof, each piston comprising a short section of tubing 12 of sufficient length to permit substantial relative sliding or lost motion of the piston rod and piston when either the push or the pull connection on the piston rod is not operating. Welded to the outer cylindrical face of each section of tubing 12 near the base thereof is an annular guide or flange portion 14 of approximately the inner diameter of the cylinder 2. The tubing section 12 and the flange 14 together comprise the piston.

A compression spring 22 is arranged between the two pistons and bears, at its ends, against the flanges 14 of the pistons. The spring 22 is advantageously under sufficient initial deflection (in this case) so that, in the normal mean position of the piping or other load to which it is connected, the pistons will be at their outer limits of movement and there will be no spring loading on the piping.

As shown, the annular flange portion 14 of each piston is spaced a slight distance from the abutment engaging end of the tube 12 and a ring of cushioning material 24 is located between the flange 14 and the abutment plate 4 or the abutment 6. This cushioning ring may be made of any material suitable for shock absorbing and sound-deadening purposes, such as that sold under the trade-mark "Fabreeka," and may be of sufficient thickness normally to prevent actual engagement of the end of the tube 12 with either the abutment plate 4 or the abutment 6.

Each of the tubes 12 has welded into its end which is remote from the abutment engaging end a piston rod guide 26 having a central guide opening 27 through which the piston rod 28 may slide as it effects the movement of the other piston against the tendency of the spring 22 to maintain it in abutting relation to the abutment 4 or 6. The piston rod 28 at its upper end in Figure 1 is shown as threaded and provided with a nut 30 normally bearing on a washer 32 approximating the inner diameter of the tubular portion 12 of the piston, this washer in turn bearing against a cushioning ring 34 which may also be made of "Fabreeka" and which is located between the washer 32 and the piston rod guide 26. Below the guide 26 in the lower piston in Figure 1 the piston rod 28 is enlarged as shown at 36 which provides a shoulder 37 upon which rests a washer 32 and cushioning ring 34 identical with those at the upper end of the rod 28. The washer 32 may be welded to the rod 36 at 37 and the nut 30 may be welded to the piston rod 28 at its upper end.

To provide a guideway for the enlarged portion 36 of the piston rod a bushing 46 of any suitable bushing material such as bronze or babbitt is provided in the adjusting sleeve 7. The portion 36 of the piston rod is shown as extended sufficiently above and below the sleeve 7 and bushing 46 to provide for the maximum spring compressing movement of each piston in the cylinder 2.

As above suggested, the spring action of the sway brace of the present invention is so limited that it comes abruptly to zero at the point of proper support; in other words, if the device is intended to brace steam piping against sway and whip in its hot condition the connection between the piping and the sway brace is so adjusted that, in the normal operating condition of the piping, each of the pistons is maintained by the spring 22 in abutting relation to the associated abutment 4 or 6, in which position there is obviously no spring loading on the piping. To provide for adjustment to suit the particular condition of the piping in which it is desired that the spring loading be zero, the lower end of the piston rod 36 is hollow and internally threaded to receive the threaded end of a screw eye 48 or any other intermediate element of the connection to the piping such, for example, as the ball of a universal joint, the internal thread in the extension 36 and the external thread on the stem 50 of the screw eye being of sufficient extent to provide for a considerable adjustment of this connection.

Figure 11:
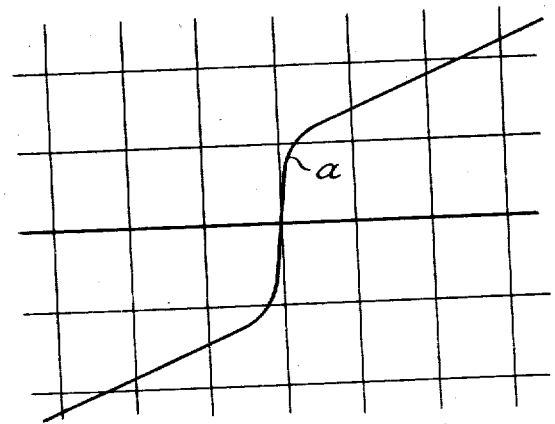
Figure 11 is a similar diagrammatic representation of the load-deflection characteristics of sway braces having springs of identical characteristics (e. g.

When the hanger has been adjusted to support the piping at zero spring loading, any vibration set up in the piping will apply the load alternately to opposite ends of the spring 22 through first one piston and then the other and thus the spring will be deflected by loads acting successively in opposite directions from a predetermined mid-point. Moreover, as soon as the load returns to the mid-point the spring action is stopped by the abutment. There can be no overshooting of the spring beyond the zero point. As illustrated by curve $a$ in Figure 11, the spring 22 is stopped by abutment against the ends before it has expanded to its full relaxed length. Consequently the spring loading is abruptly dropped to zero and abruptly rises again in the opposite direction when the opposite piston is picked up and moved. The resulting discontinuity in the load-deflection characteristic aids greatly in damping any tendency to harmonic vibration. This embodiment of my invention is specifically described and claimed in my Patent No. 2,420,276.

In the embodiment of the invention illustrated in Figure 2, two springs 22a and 23 are employed in lieu of the single spring of Figure 1 to give the hanger or sway brace its non-harmonic characteristic. In this embodiment of the invention the non-resonant spring mechanism is located within the tube 2a extending the full length of the hanger or brace and having end plugs 5a and 6a secured at its ends as by welding, as shown. The lower plug 5a is drilled and threaded for reception of the threaded end of the abutment or stop 7a which is made with suitable means for engaging a wrench for adjustment and is held in adjusted position by a lock nut 9a. In the upper plug 6a the adjustable stops comprise threaded studs 62, secured in their adjusted positions by lock nuts 64. A rod 8a welded into the plug 6a and threaded at its outer end may serve as a part of a turnbuckle or other connecting means for connecting the sway brace or support to any suitable anchorage.

The abutment member or stop 7a is provided with a hole to receive the rod 3a. The springs 22a and 23 are compression springs and are advantageously of approximately the same length when balanced against each other. They may be substantially pre-compressed against the abutment plugs 4a as in the case shown in Figure 2 and described above, or they may have respectively different load-deflection characteristics, or both. The ends of these springs are fitted onto abutment plugs 4a.

The plunger rod 3a may be a simple rod threaded at its outer end to receive a turnbuckle or other suitable means for connecting it to the piping to be supported or braced and threaded at its inner end to screw into the plunger 32a. The opposite ends of this plunger 32a bear respectively against the inner end plugs 20a of the springs 22a and 23 through rubber cushion rings 34a received in hollow sockets in the plugs 20a. Thus as the plunger 32a moves in either direction it engages one or the other of these abutment plugs 20a and consequently must move against the resistance of one or the other of the springs 22a or 23.

The plunger 32a is guided in its movements by a fixed cylinder guide 12a. The cylinder 12a is fixed in concentric relation to the cylinder or tube 2a by means of washers 82 welded respectively to the cylinder 12a and to the inner wall of the tube or cylinder 2a, the ends of the cylinder 12a which serve as abutments projecting sufficiently through the fixed washers 82 so that they may receive buffer washers 24a of rubber or other shock absorbing material which may be of a thickness somewhat greater than the amount of the projection of the plunger guide 12a through the washers 82.

In use the device may be connected between a pipe line and any suitable supporting frame or anchorage and adjustment so made that, with the pipe at rest in its normal condition of use, the plunger 32a is within the cylinder guide 12a. Stops 7a and 62 may be adjusted to impose any desired pre-loading on either spring or both.

As soon as the pipe moves, plunger 32a picks up one or the other of the end plugs 20a and thus compresses one or the other of the springs 22a or 23. The spring thus opposes the initial motion, but, if the motion were periodic and of frequency to which the elastic system including the spring were resonant, the spring would actually amplify such periodic motion if it were not that the action of each spring is positively terminated at the mid-position and the other spring then brought into action to oppose movement in the opposite direction. Any tendency to resonance of the one spring on one half cycle of a vibratory movement is thus opposed or damped by the other spring on the other half cycle so that resonant motion cannot develop. If the springs are identical, this action is represented by curve a of Figure 11. If the springs have different characteristics, then graph b of Figure 10 represents the action of the unit; and if the springs are not pre-stressed, but become relaxed at the neutral point, the action is as represented by graph c in Figure 10.

This embodiment of the invention is more specifically described and claimed in my Patent No. 2,421,822.

In the embodiment of the invention shown in Figure 3, two springs 22b and 23b are used in a spring hanger, but the action of one spring is positively limited at a mid-point in the operating range of the hanger, while the other continues operative throughout said range. This can be by one spring going solid (i. e. its turns coming up against one another) or by one being of greater stiffness than the other so that the telescopic coupling member strikes one end of the housing, or both conditions may exist together.

As shown in Figure 3, the spring 22b bears against the abutment 4b and the spring 23b against the piston 89. The other ends of these springs are received in the telescopic coupling or floating plunger 11b having an inner flange 26b holding spring 23b and an outer flange 14b bearing against the upper end of the spring 22b. As shown, the load-deflection rate and pitch and proportioning of the springs are such that the spring 23b will have its turns just closed together at the normal position of the load at which the vibration to be damped would occur and the flange 14b will at the same time strike piston 89. In this condition the turns of spring 22b will still be spaced apart. Although in Figure 3 the deflection of the spring 23b is simultaneously limited by abutment of the plunger 11b against piston 89 and by spring 23b going solid, either of these alone can be relied upon.

Figure 12:
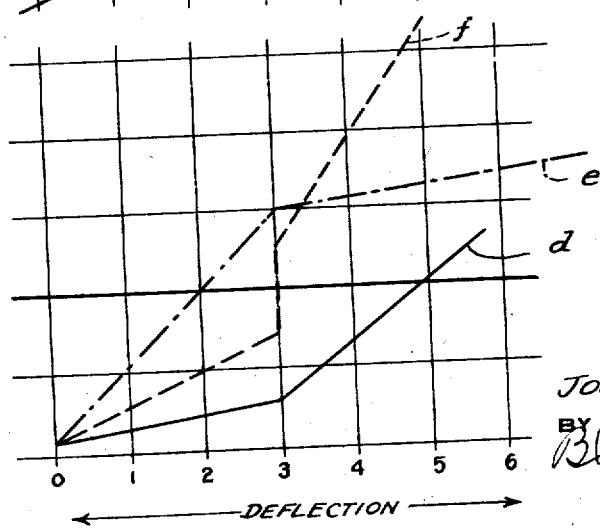
Figure 12 is a similar diagrammatic representation of the load-deflection characteristics of hangers such as those of Figures 3, 5, 6, 7, and 8.

When vibrations of the piping, or other device to be supported are impressed on the hanger, so that the piston tends to move up and down, the downward movement then acts through the solidly compressed spring 23b and is therefore absorbed entirely in the spring 22b; and upward movement beyond the normal mid-point, not only relaxes the spring 22b but also allows opening out of the spring 23b, that is, its turns will separate from each other substantially, thus changing the characteristic of the support unit as a whole, from that of the single spring 22b to that of the two springs acting in series. This is shown by the graph d in Figure 12.

An inverse arrangement in which the spring 22b is of short pitch so that it goes solid while spring 23b of longer pitch remains in action, would give the same ultimate result. If neither spring goes solid before one is so far compressed that the coupling 11b strikes either the piston 89 or the abutment 4b, a similar effect is produced.

Resilient buffer pads or washers similar to those shown at 24 and 34 in Figure 1, and 24a and 34a of Figure 2, may be used in all embodiments of my invention but are omitted in this and subsequent figures to simplify the showing.

In the embodiment of the invention shown in Figure 4, two tension springs 22c and 23c, of different load-deflection characteristics, are anchored at their outer ends to frame members 94 through clamps 96 and turnbuckles 100, the turnbuckles being connected to the springs through end plugs 101. Each of the springs is provided at its inner end with an end plug 104 having therein longitudinal bore 106 in which is fitted a bolt or plunger rod 108. A head or other abutment 110 limits the movement of the bolt in the end plug and thus causes the bolt to extend the spring on movement of the pipe or other supported apparatus in one direction. The web member 112 is welded to the pipe P and to the rod 108, at the mid-point thereof. The turnbuckles 100 are so adjusted that, when the pipe is in operating condition, the web 112 is at the mid-point of the spring support with the heads 110 approximately bearing, but with little if any force, against the plugs 104. Upon movement of the pipe in either direction the movement is transmitted through the web 112 to the bolt 108 and thereby to one of the springs 22c or 23c. The other end of bolt 108 meanwhile moves freely into the center of the other spring through its end plug 104. This action is represented by graphs a, b or c, depending upon whether the springs are the same, are different and at least one pre-stresed by "backwind" or are different but relaxed when closed turn-to-turn in the neutral position.

This device may also be used as a support by using for the upper spring one having a backwind stress adapted to balance the weight of the suported load. "Backwind" is the term commonly used to describe the condition of stress in a coil spring by which one turn presses with substantial force against an adjacent turn. As a consequence of this condition the spring withstands substantial tension without extension; and only begins to stretch when the tensile force is great enough to overcome such stress within the closed coil.

In the embodiment of the invention shown in Figure 5, the non-harmonic characteristic of the support is provided by series tension spring means. Two tension springs are connected in series and one of them is limited in its extension by external means so that when deflection takes place in one direction the deflection of one of said springs ceases abruptly at the limit position. As shown in Figure 5, two tension springs 22d and 23d are connected in series through a common plug 104d having a central bore. At its outer end the spring 22d is provided with a plug 101d which may be connected by any suitable means, such as a bale or eye plate 8d, to the anchorage. The opposite end of the spring 23d is provided with a plug 102 having a central bore. A rod 108d is secured at one end to one of the plugs 102 or 104d and is slidable in the other, with its head 110d at its outer end which limits its movement through the plug, and therefore the deflection of the spring 23d. Any suitable means such as a yoke 48d may be provided for connecting the plug 102 to a turnbuckle or other means through which an adjustable connection can be made to the piping or other device to be supported.

The springs 22d and 23d may have differing load-deflection characteristics. If the spring 22d is of less stiffness than the spring 23d a load applied to the coupling 48d will pull the plug 102 so as to engage the head 110d of the rod 108d with plug 104d before very much extension of the spring 22d has been effected.

If, therefore, a hanger for piping, having the series tension spring means just described embodied therein to provide its non-harmonic load-deflection characteristics, be so adjusted that in its normal operating position the plug 104d is substantially in engagement with the head 110d, but with little or no force exerted on the head, it will be seen that when vibrations are impressed upon the hanger the movement of the load in one direction will cause the spring 22d to act alone, while the movement of the load in the other direction will bring the spring 23d again into action. There is thus provision for abruptly changing the load-deflection characteristic of the device as a whole. This is as represented by graph d in Figure 12.

If the spring 22d is made with backwind such as to just balance the normal static load, then movement beyond the mid-point of normal operation in the direction of the load's force extends spring 22d only; whereas movement above this point affects only the spring 23d. Although I show in each case separate springs of different characteristics connected by a coupling member, it will be understood that these springs may be integral parts of a single continuous coil, e. g. such as is shown in my copending application No. 390,415.

In the embodiment of the invention shown in Figure 6, series compression and tension spring means provide the hanger with a non-harmonic characteristic. The compression spring 22e is shown as supported within a cylindrical casing 2e which has its outer face near one end formed with a thread at 142 for connecting it to the tension spring 23e. A piston 89e in the cylinder 2e is provided with a piston rod 28e by which it may be connected to a turnbuckle or other means for connecting it to the load or anchorage. At its other end the spring 23e is provided with plug 101e having secured thereto a rod 8e which may be threaded at its outer end to screw into a turnbuckle or other means for adjustably connecting the hanger to an anchorage or the load.

From the foregoing description it will be seen that the hanger shown in Figure 6, when connected to a pipe and when so adjusted that the loading imposed upon it by the pipe serves to bring the turns of the spring 22e substantially into contact with each other at a normal mid-point, will have an abrupt change in characteristic when the pipe moves through its corresponding normal mid-point, as during vibration of the pipe. Above the mid-point both springs act in series; whereas below said point the spring 22e becomes static and only the spring 23e varies in its reaction to varying forces. This condition is represented by the load-deflection graph e in Figure 12.

In Figure 7 is shown a spring hanger for piping or the like wherein a tension spring 23g which is, when released, a solid coil, with or without backwind, is held to a housing 2g by a threaded plug 156 integral with the end 6g of the housing. A plug 104g in the lower end of the spring has a central bore in which the rod 28g can slide upward but, because of its head 110g cannot slide downwardly beyond the relation shown. A flange 89g on the rod 28g engages the top of a compression spring 22g, the bottom of which is supported by the bottom end 4g of the housing.

This device is mounted and adjusted so that at the normal mid-point of the load the parts are in the relation shown. In this position the weight of the load is balanced by compression of the spring 22g plus the backwind of spring 23g, if any. When the load moves upward the device follows the load-deflection characteristic of the spring 22g, but when it moves down it picks up the spring 23g and therefore has a steeper load-deflection characteristic. This is as shown in the graph d of Figure 12 when the spring 23g is made with no backwind. If the spring is made with substantial backwind the characteristic will be as in curve f of Figure 12.

In Figures 8 and 9 there is shown another embodiment of the invention in which the load is carried by a tension spring 22h up to the midpoint of normal operation, at which point a flange 89h picks up a compression spring 23h from the abutment member 160 and thus the load-deflection characteristic of the device as a whole changes abruptly as shown in Figure 12d.

The housing 2h is substantially identical to that shown in Figure 7 and the spring 22h is secured thereto in the same manner. The piston 104h, unlike the piston 104g, is rigidly secured to piston rod 28h; although, since spring 22h is at all times under tension, this difference is one of convenience in manufacture and is not essential to the operation.

As best shown in Figure 9, the flange 89h secured to the piston rod 28h is multi-segmental in form and the abutment member 7h is provided with segmental petals 160 which fit between the segments of the plate 89h and are integral with the threaded stem of the adjustable abutment member 7h. An adjusting nut 161 threaded on the abutment member 7h is provided with a flange 162 upset on the inside over a bearing washer 163. Thus the nut 161 provides for adjustment of the abutment position without the necessity for turning the abutment member 7h. Cross slots or castellations 164 are provided in the end of the member 7h by which it can be gripped with a suitable wrenching tool and held against turning while adjustment is being made. A lock nut 9h is provided to secure the adjustment.

Figure 13:
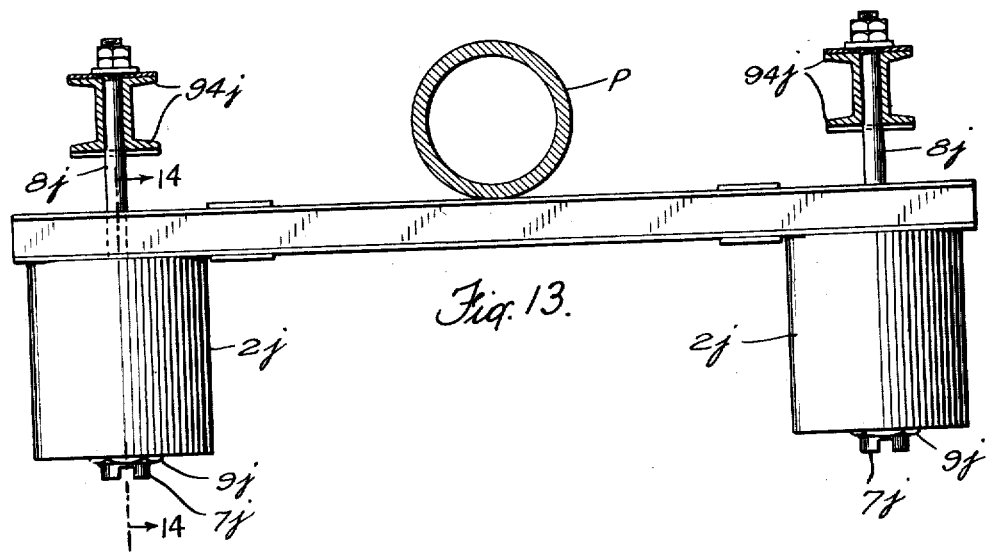
Figure 13 is a view in elevation of a spring seat for piping.
Figure 14:
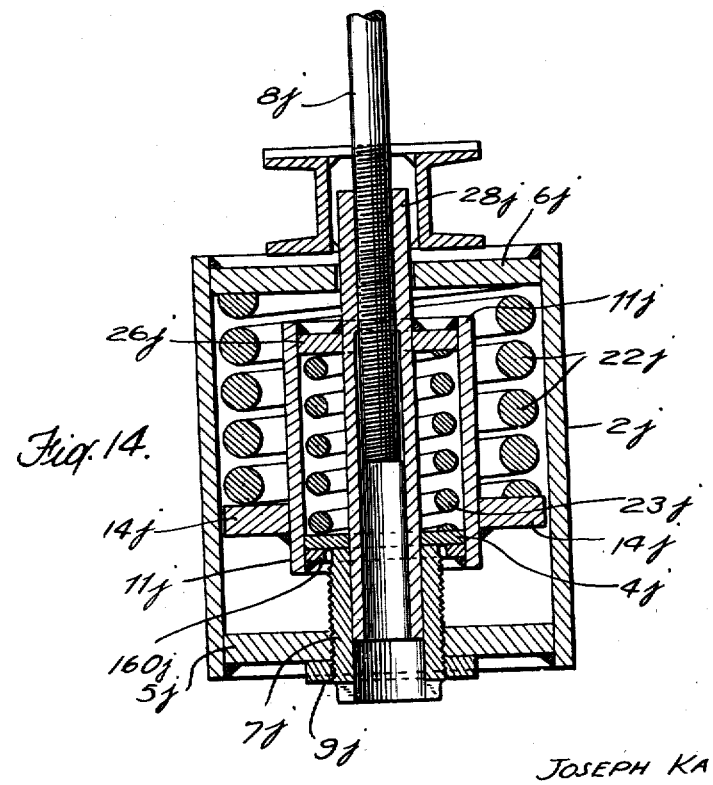
Figure 14 is a view in axial section of one of the spring devices shown at the opposite ends of Figure 13.

In Figures 13 and 14 I have shown a spring seat carrying piping P from a beam 94j. As shown, a rod 8j is secured to the beam and is threaded into a tubular piston rod 28j; onto this rod is welded, or otherwise secured, an inner spring guide 11j, the inner flange 26j of which bears against an inner spring 23j and the outer flange 14j of which forms a bearing for the spring 22j.

A housing 2j is provided with an upper abutment 6j through which the tubular piston rod 28j is slidable and a lower end 5j into which adjustable abutment member 7j is threaded and secured by lock-nut 9j. An abutment washer 4j is normally carried on the upper end of the abutment 7j and forms the bearing for the lower end of spring 23j.

Beneath the washer 4j a larger washer 160j is welded to the inside of the inner spring guide 11j to form an annular shelf.

In the operation of the construction described the abutment member 7j is adjusted with the load applied and in its operating position so that the upper end of the abutment member 7j just lifts the abutment washer 4j away from shelf 160j. Thus, in any alternating movements, e. g., due to vibration or inertia, an upward movement of the load results in compression of the spring 23j, at the same time producing a relaxation of spring 22j; whereas a downward movement of the load results in further compression of the main spring 22j, while spring 23j is held on the shelf 160j and therefore has no further effect on the operation below this point. As will be observed, the load-deflection characteristic of this spring is of the type shown at e in Figure 12 with the midpoint of normal operation on the line numbered 3.

In high temperature piping, or with other loads subject to substantial movement between the idle position and a normal operating position, it is highly advantageous to so connect the device that the operation with the lower stiffness, i. e., the turn of the load-deflection curve of lower slope occurs throughout the movement between the idle position and the operating position and the shift to the higher slope occurs upon movement beyond a mid-point of normal operation. Thus, with the arrangement shown in Figure 13 it may be assumed that the pipe shown in cross-section is connected to a vertical leg extending downwardly to a fixed connection so that upon heating to operating temperature the pipe tends to be depressed due to thermal expansion of the riser. Thus the cold weight of the pipe brings the device to a position on its load-deflection characteristic e in Figure 12 well to the right of the ordinate "3." Movement resulting from heating to the operating temperature is to the left along the right-hand portion of the characteristic e of Figure 12 along this line until the ordinate "3" is reached at the operating temperature and the cooling again to room temperature moves to the right. Inertia and vibratory movements to the left of ordinate "3" are in the range of greater stiffness. Obviously this relationship may be obtained with characteristics such as those shown in Figure 10 and at f and d in Figure 12, if the movement due to thermal expansion is upward instead of downward, the movement between an idle and operating position being in each case on that side of the mid-point on which the characteristic has the lower slope and therefore the lesser stiffness. It is an important advantage, however, to have the movement due to primary loading also occur on the steeper slope (i. e., the stiffer action of the device).

As I have illustrated by the foregoing examples the invention is capable of use in various forms both for supports, in which the weight of the load is carried by the spring means, and in steadying devices, such as sway braces for piping, in which the static loading is zero (or relatively insignificant) but inertia forces or fluctuations in dynamic loading are imposed upon the spring means. In all of these applications it will be noted that at least one of the spring means is positively limited so that it comes into or goes out of action abruptly, thereby causing an abrupt change of load-deflection characteristic, at the normal mid-point of vibratory movements to which the device is subjected.

Although coil springs have been shown in all the examples described because they are in general most convenient to procure and use, it will be understood by those skilled in the art that other types of springs or other elastic members acting as spring means may be used as equivalents.

I claim:

1. A device for mounting a load such as piping and other equipment subject to alternating movements, which comprises spring means arranged for elastic deflection and recovery upon movement of said load in opposite directions through a predetermined mid-point under the action of forces successively impressed thereon, said device being characterized by having means for abruptly resisting deflection of at least a part of said spring means in one direction beyond a mid-point which corresponds to said mid-point in the movement of the load, thereby to prevent harmonic oscillation, said device also having connections to the load and to an anchorage so arranged that relative movements between the load and the anchorage impress the aforementioned deflections on said spring means.

2. A device according to claim 1 in which the means for abruptly resisting deflection of one part of the spring means restrains it against further reaction when the other part is being deflected by an applied force.

3. A device according to claim 1 in which the spring means comprise a plurality of springs in series, one of which comes, at the predetermined mid-point, to a substantially solid condition so that it no longer functions as a deflecting part of said spring means during movement beyond said mid-point.

4. A device according to claim 1 in which the spring means comprise a plurality of springs in series, including a tension spring and means for positively limiting the deflection of one of said springs substantially at the predetermined mid-point so that it ceases to function as a part of said spring means when said point is passed.

5. A device according to claim 1 in which the spring means comprise a plurality of springs at least one of which is a tension spring pre-stressed in its solid turn-against-turn condition, and the connections from said spring to the load are adapted to bring said tension spring to said solid condition as said mid-point is reached, whereby the load-deflection characteristic of the device is abruptly altered as said mid-point is passed.

6. A device according to claim 1 in which the spring means has, as a part thereof, a tension spring deflectible in one direction only from said mid-point.

7. A device for mounting a load such as piping and other equipment subject to alternating movements, which comprises a plurality of springs, at least one of which is a compression spring and another of which is a tension spring, one of said springs being adapted to accommodate the entire range of said movements within its elastic limit and the other of said springs being limited in its deflection to movements on one side only of a normal mid-point, and means for connecting said springs together and to the load and an anchorage, respectively.

8. A device according to claim 1 in which the spring means comprise a plurality of springs in parallel, one of which, at the predetermined mid-point, comes to a substantially solid condition.

9. A device according to claim 1 in which the spring means has, as a part thereof, a compression spring that goes solid when the load causes deflection of said means in one direction beyond said mid-point.

10. A device for mounting a load such as piping and other equipment subject to alternating movements which comprises a plurality of compression springs, one of which is telescoped within the other, a coupling member telescoped between said springs connected to one end of the spring surrounding it and to one end of an inner spring whereby to transmit a compression force between them, means for connecting the opposite ends of said springs respectively to the load and to an anchorage, and an abutment associated with the latter end of one of said springs in the path of movement of and positioned to limit said coupling member before the other spring reaches the end of its range of deflection.

11. A device for mounting a load such as piping and other equipment subject to alternating movements, which comprises a plurality of compression springs at least partially telescoped into one another, a coupling member telescoped between them and connected at its opposite ends to opposite ends of the telescoped springs, and means for connecting the external ends of the springs to the load and to an anchorage respectively, one of said springs being of stiffness and pitch such that it is compressed turn-against-turn by the mean normal force exerted thereon by the load and another spring connected in series therewith is of stiffness and pitch such that it does not reach its limit of elastic deflection within the normal movements of the load.

12. A device for mounting a load such as piping and other equipment subject to alternating movements, which comprises a plurality of tension springs, a coupling member connecting one end of one spring to an end of another spring, means for connecting external ends of said springs respectively to the load and to an anchorage, and a lost-motion connection between the ends of one of said springs adapted to limit extension of the spring, and another of said springs not so limited is adapted to deflect progressively within its elastic limit both within and substantially beyond the limits of movement established by said limiting means.

13. A device for mounting a load such as piping and other equipment subject to alternating movements which comprises load-carrying members one connected to the load and one connected to an anchorage, opposed springs engaging between said load carrying members, one of said springs being adapted to engage between the load and the anchorage throughout all normal movements of the load and the other being adapted to engage therebetween only on one side of a mid-point of normal alternating movement, said members in their movements beyond said point being relieved of the force of said second-named spring.

14. A device for mounting a load such as piping and other equipment subject to alternating movements which comprises load-carrying members one connected to the load and one connected to an anchorage, opposed springs engaging between said load carrying members, one of said springs being adapted to engage between the load and the anchorage on one side of a mid-point of normal alternating movements and the other being adapted to engage therebetween only on the other side of the mid-point of normal alternating movement, said members in their movements beyond said point being relieved of the force of said second-named spring.

15. A device for mounting a load such as piping and other equipment subject to alternating movements, which comprises load-carrying members one connected to the load and one connected to an anchorage, a main spring engaged between said members adapted to accommodate said alternating movement of the load to both sides of a mid-point and an auxiliary spring which is opposed to the main spring on one side, and only on one side of said mid-point.

16. A device for mounting a load such as piping and other equipment subject to alternating movements, which comprises spring means adapted to act between load and an anchorage throughout the normal range of said alternating movements, and means for reducing abruptly the stiffness of said spring means at a mid-point in the deflection thereof as the force exerted on the load is increased and correspondingly to increase the stiffness as the force is decreased by movement through said mid-point.

17. A device for connecting to an anchorage a load such as piping and other equipment subject to movements between idle and operating positions and to alternating movements at the operating position, which comprises a spring device the load-deflection characteristic of which changes its slope abruptly at a mid-point in its operating range and means so connecting the spring device to the load and to the anchorage that said abrupt change occurs at a mid-point of said alternating movements at the operating range, and in movement from the idle position to the operating position said device has a characteristic of lower slope and upon continued movement beyond said mid-point it has a characteristic of higher slope.

18. A device for connecting to an anchorage a load such as piping and other equipment subject to movement between idle and operating positions which comprises opposed springs only one of which acts with relatively low stiffness to accommodate movement between the idle and operating positions and at least the other acts, with increase of stiffness beyond a mid-point of said alternating movements in the operating position, means connecting the first spring between the load and its anchorage and means including a lost-motion connection for the other spring between the load and its anchorage, said lost-motion connection being adapted to engage said second spring when the load moves beyond said mid-point away from the idle position and to release said second spring when the load moves past said mid-point toward the idle position.

JOSEPH KAYE WOOD.

REFERENCES CITED

The following references are of record in the file of this patent:

UNITED STATES PATENTS

| Number | Name | Date |
|---|---|---|
| 2,215,238 | Wert | Sept. 17, 1940 |
| 2,335,834 | Wood | Nov. 30, 1943 |